(12) United States Patent
Mishkin et al.

(10) Patent No.: US 10,171,602 B2
(45) Date of Patent: *Jan. 1, 2019

(54) DETERMINING DEVICE COUNTS

(71) Applicant: comScore, Inc., Reston, VA (US)

(72) Inventors: Gregory Evan Mishkin, Cumming, GA (US); Kartik Bhaghavatula, Leesburg, VA (US)

(73) Assignee: comScore, Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/729,305

(22) Filed: Oct. 10, 2017

(65) Prior Publication Data

US 2018/0034928 A1 Feb. 1, 2018

Related U.S. Application Data

(63) Continuation of application No. 15/049,333, filed on Feb. 22, 2016, now Pat. No. 9,787,786, which is a continuation of application No. 13/955,182, filed on Jul. 31, 2013, now Pat. No. 9,270,547.

(60) Provisional application No. 61/677,831, filed on Jul. 31, 2012.

(51) Int. Cl.
*H04L 29/08* (2006.01)
*H04W 4/08* (2009.01)
*H04L 12/26* (2006.01)

(52) U.S. Cl.
CPC ............ *H04L 67/22* (2013.01); *H04L 43/062* (2013.01); *H04L 43/065* (2013.01); *H04L 67/02* (2013.01); *H04W 4/08* (2013.01)

(58) Field of Classification Search
CPC ....... H04L 43/062; G06Q 50/00; G06F 17/30; G06F 30/0481; G06F 3/04842
See application file for complete search history.

(56) References Cited

U.S. PATENT DOCUMENTS

| | | | |
|---|---|---|---|
| 9,270,547 B1* | 2/2016 | Mishkin | H04L 43/10 |
| 9,787,786 B1* | 10/2017 | Mishkin | H04L 67/22 |
| 2011/0004682 A1* | 1/2011 | Honnold | G06Q 30/02 709/224 |
| 2012/0143992 A1* | 6/2012 | Salamatov | G06F 9/5027 709/219 |

* cited by examiner

*Primary Examiner* — Kim T Nguyen
(74) *Attorney, Agent, or Firm* — Baker & Hostetler LLP (57) ABSTRACT

Evaluating web activity is disclosed. Initially, activity data for one or more resources on a network is received for a predetermined time period. The resources have been accessed by a plurality of client systems, and the activity data includes a unique identifier and a category of an accessing client system for each access to the one or more resources. Next, at least one persistent identifier of a client system within the activity data is identified. A subset of the activity data associated with the at least one persistent identifier is also identified. Based on the subset of the activity data, a total number of accesses to the one or more resources from the client system having the persistent identifier is determined. Finally, an estimated number of accesses to the one or more resources from the client system is determined if the persistent identifier persisted on the client system during the entire predetermined time period.

20 Claims, 5 Drawing Sheets

| Cookie | Prior Month | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | Persistence | Include? |
|---|---|---|---|---|---|---|---|---|---|---|---|---|---|---|---|---|---|---|---|---|---|---|---|---|---|---|---|---|---|---|---|---|---|---|
| | | | | | | | | | | | | | | | | | | | | | | | | | | | | | | | | | Current Month | | |
| A | | | | | X | | X | | | | X | X | | | | | X | X | | | X | X | X | | | | | | | | | | >=17 days | Yes |
| B | X | | | | | X | X | X | | | | | | | X | | | | | | | | | | | | X | X | | | | | 24 days | Yes |
| C | X | | X | | | X | X | X | | | X | X | X | | | | | | | | | | | | | X | | | | | | | 17 days | No |
| D | | | | | | | | | X | | X | | | | | | | | | X | X | | | X | | | | | | | | | 12 days | No |
| E | X | X | X | | X | | | | | | | | | | | | | | | | | | | | | | | | | | | | 6 days | No |

FIG. 5

DETERMINING DEVICE COUNTS

CROSS-REFERENCE TO RELATED APPLICATION

This application is a continuation of U.S. application Ser. No. 15/049,333, filed Feb. 22, 2016, which is a continuation of U.S. application Ser. No. 13/955,182, filed Jul. 31, 2013, and issued as U.S. Pat. No. 9,270,547 on Feb. 23, 2016, which claims the benefit of U.S. Provisional App. No. 61/677,831, filed Jul. 31, 2013, each of which is incorporated herein by reference in its entirety.

BACKGROUND

Internet audience measurement may be useful for a number of reasons. For example, some organizations may want to be able to make claims about the size and growth of their audiences or technologies. Similarly, understanding consumer behavior, such as how consumers interact with a particular web site or group of web sites, may help organizations make decisions that improve their traffic flow or the objective of their site. In addition, understanding Internet audience visitation and habits may be useful in supporting advertising planning, buying, and selling.

SUMMARY

In an aspect, a set of activity data for a set of one or more resources on a network is accessed. The set of resources were accessed by a group of client systems and the set of activity data was determined based on beacon messages received from the group of client systems sent as a result of beacon instructions included with the first set of resources. The set of activity data represents cookies received with the beacon messages and a total count of the beacon messages received from the group of client systems. Persistent cookie data is determined based on the set of activity data. The persistent cookie data represents multiple persistent cookies and, for each persistent cookie, a total count of beacon messages received from a client system associated with the persistent cookie. Each persistent cookie is associated with a different client system from the group of client systems and is received with beacon messages that span a threshold amount of time during a reporting period. Weighted count data is determined based on the persistent cookie data. The weighted count data represents the multiple persistent cookies and, for each persistent cookie, an estimated count of beacon messages that would have been received with the persistent cookie from the client system associated with the persistent cookie if the persistent cookie persisted on the client system during the entire reporting period. A count per device value is determined based on the weighted count data. The count per device value indicates an average number of beacon messages received per device during the reporting period. A count of unique devices that have accessed the set of resources during the reporting period is determined based on the count per device value and the total count of beacon messages received from the group of client systems.

Implementations may include one or more of the following features. For example, determining the persistent cookie data may include determining that a difference between a first time a cookie is received with a beacon message and a second time the cookie is received with a beacon message is greater than the threshold amount of time and, in response to determining that the difference is greater than the threshold, identifying the cookie as a persistent cookie. The reporting period may be a month and the threshold amount of time may be a threshold number of days.

The reporting period may be divided into subunits and the threshold amount of time may be a threshold fraction of subunits in the reporting period. Determining the persistent cookie data may include determining that a fraction of the subunits in the reporting period in which a cookie is received with a beacon message exceeds the threshold fraction of subunits in the reporting period and, in response to determining that the fractions exceeds the threshold fraction of subunits in the reporting period, identifying the cookie as a persistent cookie.

Determining the weighted count data may include, for a given persistent cookie, determining the total time present in the reporting period, wherein the total time present is the time in the reporting period that the given persistent cookie was received with a beacon message; determining the total time not present in the reporting period, wherein the total time not present is the time in the reporting period that the given persistent cookie was not received with a beacon message; determining the total number of times the given persistent cookie was received during the reporting period with a beacon message; and determining an estimated count of beacon messages that would have been received with the given persistent cookie from the client device associated with the persistent cookie if the persistent cookie persisted on the client device during the entire reporting period, based on the total time present, the total time not present, and the total number of times the given persistent cookie was received during the reporting period with a beacon message.

Determining the weighted count data may include, for a given persistent cookie, determining an active persistency value, wherein the active persistency value is a percentage of the reporting period in which a beacon message with the given persistent cookie was received; determining an active subunit value, wherein the active subunit value is a count of subunits of the reporting period during which a beacon message with the given persistent cookie was received; determining the total time not present in the reporting period, wherein the total time not present is the time in the reporting period that the given persistent cookie was not received with a beacon message; determining the total number of times the given persistent cookie was received during the reporting period with a beacon message; and determining an estimated count of beacon messages that would have been received with the given persistent cookie from the client device associated with the persistent cookie if the persistent cookie persisted on the client device during the entire reporting period, based on the activity persistence value, the active subunit value, the total time not present, and the total number of times the given persistent cookie was received during the reporting period with a beacon message.

Determining the count per device value may include determining the count per device value based on the estimated counts of beacon messages and a total number of persistent cookies in the multiple persistent cookies.

The persistent cookie data may be subdivided into one or more groupings. Each grouping may correspond to a category of client system. Determining the weighted count data may include determining weighted count data for each of the groupings. Determining a count per device value may include determining a count per device value for each grouping based on the weighted count data for the grouping. Determining a count of unique devices may include determining a count of unique devices that have accessed the set of resources for each grouping based on the count per device value for the grouping and the total count of beacon messages received from the group of client systems.

Determining a count of unique devices that have accessed the set of resources for each grouping based on the count per device value for the grouping and the total count of beacon messages received from the group of client systems may include subdividing the total count of beacon messages received from the group of client systems into the groupings; and determining the count of unique devices that have accessed the set of resources for each grouping based on the count per device value for the grouping and the total count of beacon messages received for the grouping.

The groupings may be based on type of client system, operating system of the client system, or provider of connectivity of the client system.

Implementations of any of the described techniques may include a method or process, an apparatus, a device, a machine, a system, or instructions stored on a computer-readable storage device. The details of particular implementations are set forth in the accompanying drawings and description below. Other features will be apparent from the following description, including the drawings, and the claims.

DETAILED DESCRIPTION

In general, webpage or other resource accesses by client systems may be recorded, and those accesses may be analyzed to develop audience measurement reports. Data about resource accesses can be collected using a beacon-based approach. A beacon-based approach generally involves associating script or other code with the resource being accessed such that the code is executed when a client system renders or otherwise employs the resource. When executed, the beacon code sends a message from the client system to a collection server. The message includes certain information, such as an identifier of the resource accessed.

A beacon-based approach may employ cookies to help uniquely identify the activity of a particular machine. However, there may be difficulties in translating such activity to unique devices because cookies may be rejected by certain systems or may be deleted. For instance, mobile devices may refuse third-party cookies used in beacon messages, or may frequently clear cookies. A single device may have multiple different cookies as it deletes an existing cookie and then accepts a new cookie.

Accordingly, various techniques may be employed for accounting for these types of difficulties. For example, in various implementations, a system may analyze beacon data over a particular period of time in order to estimate the total number of unique devices in each device category (device type, platform, provider) that visited web entities during that period. The system may estimate a number of hits per device for each device category, and then apply the total number of hits associated with that device category to estimate the number of devices.

In order to estimate the number of hits per device for each device category, beacon data may be analyzed to identify persistent cookies (ones that are present for a defined time period). Each of the persistent cookies may be assumed to represent a single device over the life of the cookie. The number of hits (beacon messages received) for each persistent cookie may be weighted as though the cookie lasted for the entire reporting period. An average of the number of weighted hits for each cookie associated with a particular device category may be used for the estimated number of hits per device in that category.

In order to estimate the number of devices for each category, the data representing all of the hits recorded during the reporting period may be subdivided into categories representing the different device categories. The total number of hits for a given device category may be divided by the number of hits per device in that category to get a number of devices. In addition to absolute numbers, the system may report percentage data representing the market share of each device category.

Figure 1:
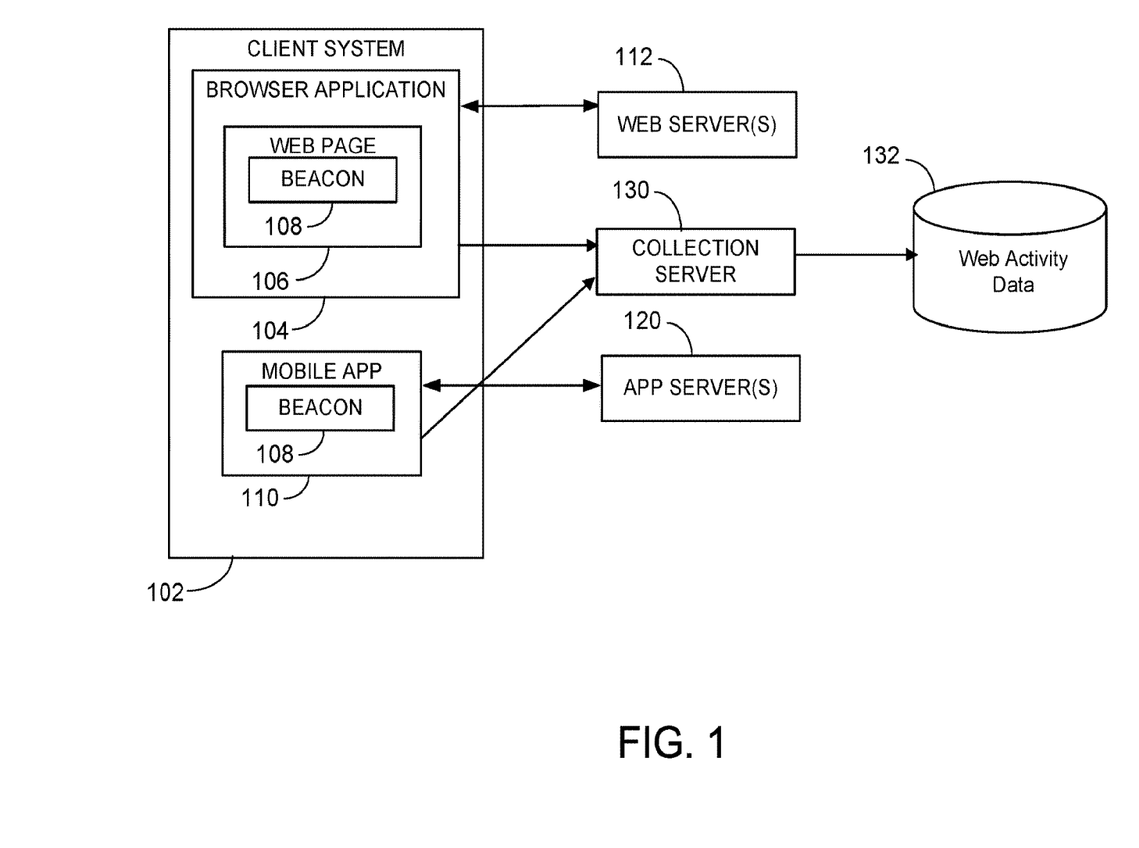
FIG. 1 illustrates an example of a system in which data can be obtained by including beacon code in one or more web pages.

FIG. 1 illustrates an example of a system 100 in which beacon code in one or more web pages may be used to collect data for Internet audience measurement. System 100 includes one or more client systems 102, the web servers 112, the collection servers 130, and the database 132. Client systems may include personal computing devices, mobile computing devices, shared use computing devices, or any other device with access to the Internet.

The client systems include a browser application 104 that retrieves web pages 106 from web servers 112 and renders the retrieved web pages. Some of the web pages 106 include beacon code 108. In general, publishers of web pages may agree with the entity operating the collection server 130 to include this beacon code in some or all of their web pages. This code 108 is rendered with the web page in which the code 108 is included. When rendered, the code 108 causes the browser application 104 to send a message to the collection server 130. This message includes certain information, such as the URL of the web page in which the beacon code 108 is included. For example, the beacon code may be JavaScript code that accesses the URL of the web page on which the code is included, and sends to the collection server 130 an HTTP Post message that includes the URL in a query string. Similarly, the beacon code may be JavaScript code that accesses the URL of the web page on which the code is included, and includes that in the URL in the "src" attribute of an <img> tag, which results in a request for the resource located at the URL in the "src" attribute of the <img> tag to the collection server 130. Because the URL of the webpage is included in the "src" attribute, the collection server 130 receives the URL of the webpage. The collection server 130 can then return a transparent image. The following is an example of such JavaScript:

```
<script type="text/javascript">
document.write("<img id='img1' height='1'
width='1'>");document.getElementById("img1").src="http://example.com/scripts/report.dll?C7=
" + escape(window.location.href) + "&rn=" + Math.floor(Math.random( )*99999999);
    </script>
```

The collection server 130 records the webpage URL received in the message with, for instance, a time stamp of when the message was received, the IP address of the client system from which the message was received, and the user-agent information in the user-agent header. The collection server 130 aggregates this recorded information and stores this aggregated information in the database 132 as site centric data 132b.

The message may also include a unique identifier for the client system. For example, when a client system first sends a beacon message to the collection server 130, a unique identifier may be generated for the client system (and associated with the received beacon message). That unique identifier may then be included in a cookie that is set on that client system 102. As a result, later beacon messages from that client system may have the cookie appended to them such that the messages include the unique identifier for the client system. If a beacon message is received from the client system without the cookie (e.g., because the user deleted cookies on the client system), then the collection server 130 may again generate a unique identifier and include that identifier in a new cookie set of the client system.

The client system 102 may further include a specialized application such as a mobile app 110 for accessing data associated with a network resource. In some implementations, a mobile app 110 may communicate with an app server 120 to send and receive data. The app server 120 may be a function of a general purpose web server 112 as above or may instead be a separate server dedicated only to proprietary applications such as the mobile app 110. In addition to accessing information associated with a resource, the mobile app may also include code 108 that includes beacon instructions for reporting usage data to the collection server 130. The beacon instructions provided to the mobile app 110 may be similar to the beacon instructions provided on the web page 106 to the browser application, but may include different information available to the mobile app 110, such as a unique device identifier.

Accordingly, as users of client systems 102 access webpages (e.g., on the Internet), the client systems 102 access the webpages that include the beacon code, which results in messages being sent to the collection server 130. These messages indicate the webpage that was accessed (e.g., by including the URL for the webpage), potentially a unique identifier for the client system that sent the message, and a user-agent of the client system. When a message is received at the collection server 130, a record may be generated for the received message. The record may indicate an identifier (e.g., the URL) of the webpage accessed by the client system, the unique identifier for the client system, a time at which the client system accessed the webpage (e.g., by including a time stamp of when the message was received by the collection server 130), a network address, such as an IP address, of the client system that accessed the webpage, and the user-agent, when appropriate. The collection server 130 may then aggregate these records and store the aggregated records as web activity data 132.

The web activity data 132 includes information about the accesses by a number of different types of client systems, such as mobile client systems, shared use client systems, and non-mobile, non-shared use personal computers. The web activity data 132 may include further information about various device categories. For example, mobile client systems may include device categories including the device ISP, platform, and make and model. The web activity data 132 directly represents accesses by the members of the larger universe to be measured; however, because of the technology involved with each type of device, there may be inaccuracies when performing measurements of device market share, or other types of measurements. The following describes techniques for estimating such data within various categories of device.

Figure 2:
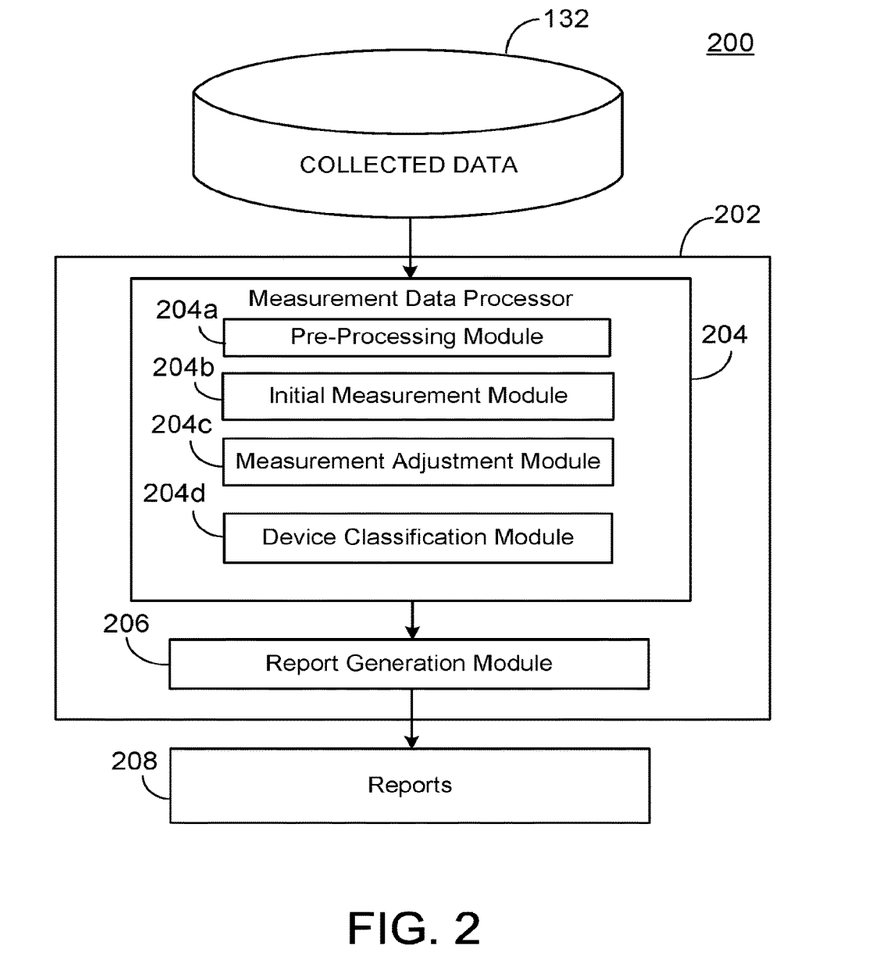
FIG. 2 illustrates an example of a system in which data can be used to generate and report measurement data.

FIG. 2 illustrates an example of a system 200 in which web activity data 132 can be used to generate measurement data. The system 200 includes a reporting server 202. The reporting server 202 may be implemented using, for example, a general-purpose computer capable of responding to and executing instructions in a defined manner, a personal computer, a special-purpose computer, a workstation, a server, or a mobile device. The reporting server 202 may receive instructions from, for example, a software application, a program, a piece of code, a device, a computer, a computer system, or a combination thereof, which independently or collectively direct operations. The instructions may be embodied permanently or temporarily in any appropriate type of machine, component, equipment, or other physical storage medium that is capable of being used by the reporting server 202.

The reporting server 202 includes one or more processors that execute the instructions that implement a measurement data processor 204 and a report generation module 206. The measurement data processor 204 includes a pre-processing module 204a, an initial measurement module 204b, a measurement adjustment module 204c, and a device classification module 204d. The measurement data processor 204 may implement a process, such as that shown in FIGS. 3 and 4, to generate unique device data based on the web activity data 132. The report generation module 206 may use the unique device data to generate one or more reports 208.

Figure 3:
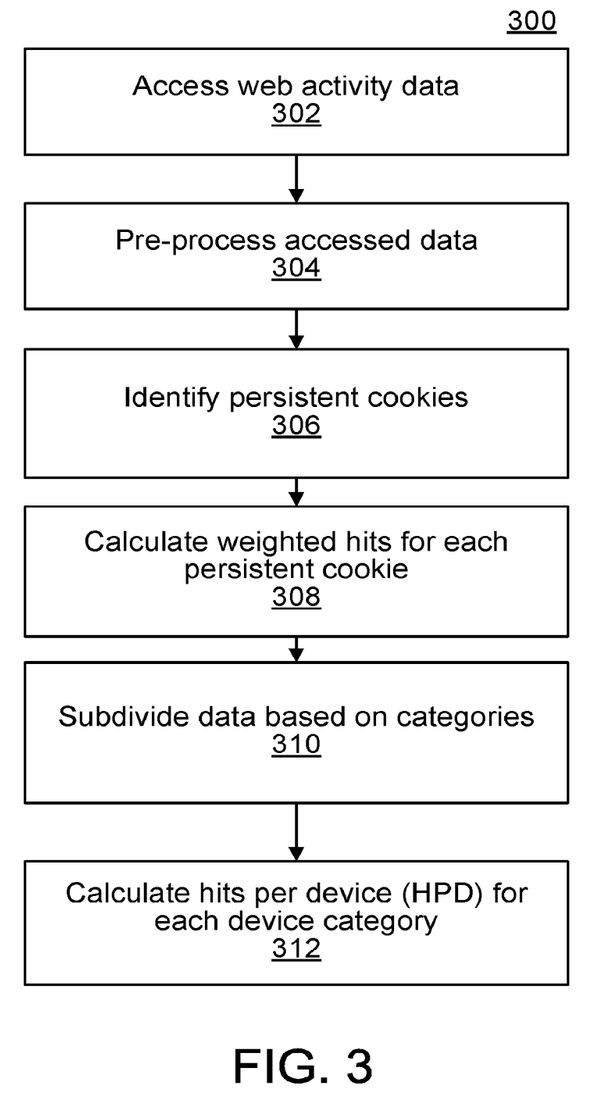
FIG. 3 is a flow chart illustrating an example of a process for generating a number of hits per device (HPD) for each category of devices.

FIG. 3 is a flowchart illustrating an example of a process 300 for generating a number of hits per device for each category of devices. The process 300 is described with the system 200 as an example, but other systems and configurations can be used. The process 300 is described here with respect to mobile devices, but the described techniques can be applied to other devices.

The pre-processing module 204a accesses the web activity data 132 (302) and performs one or more pre-processing functions on the accessed web activity data 132 (304). The data 132 may include records that reflect a URL or other identifier of a resource that has been accessed by a client system, a network address of the client system that accessed the resource, a time that the client system accessed the resource (for example, as reflected by a time stamp of the time at which the beacon message was received by the collection server 130), and a unique identifier for the client system that accessed the resource (for example, included in a cookie attached to the beacon message).

The web activity data that is accessed by the pre-processing module 204a may be the data that is aggregated for a certain time period. For example, the accessed data may be the web activity data aggregated over a defined reporting period, but may include certain additional data from the previous reporting period as well (as described below). The pre-processing module 204a may also remove from the data 132 records that are not to be included in the reporting sample. For instance, records that reflect redirects or that reflect non-human initiated request (e.g., requests made as part of rendering a web page) may be removed.

The pre-processing module 204a may process the raw data 132 to form state data that represents all of the data associated with a particular cookie, including all of the recorded hits (beacon messages) associated with the cookie and all device category information collected about that cookie, into a single record. Device categories can include, for example, the make and model of the mobile device, the mobile device platform, and the ISP serving the mobile device.

Figure 5:
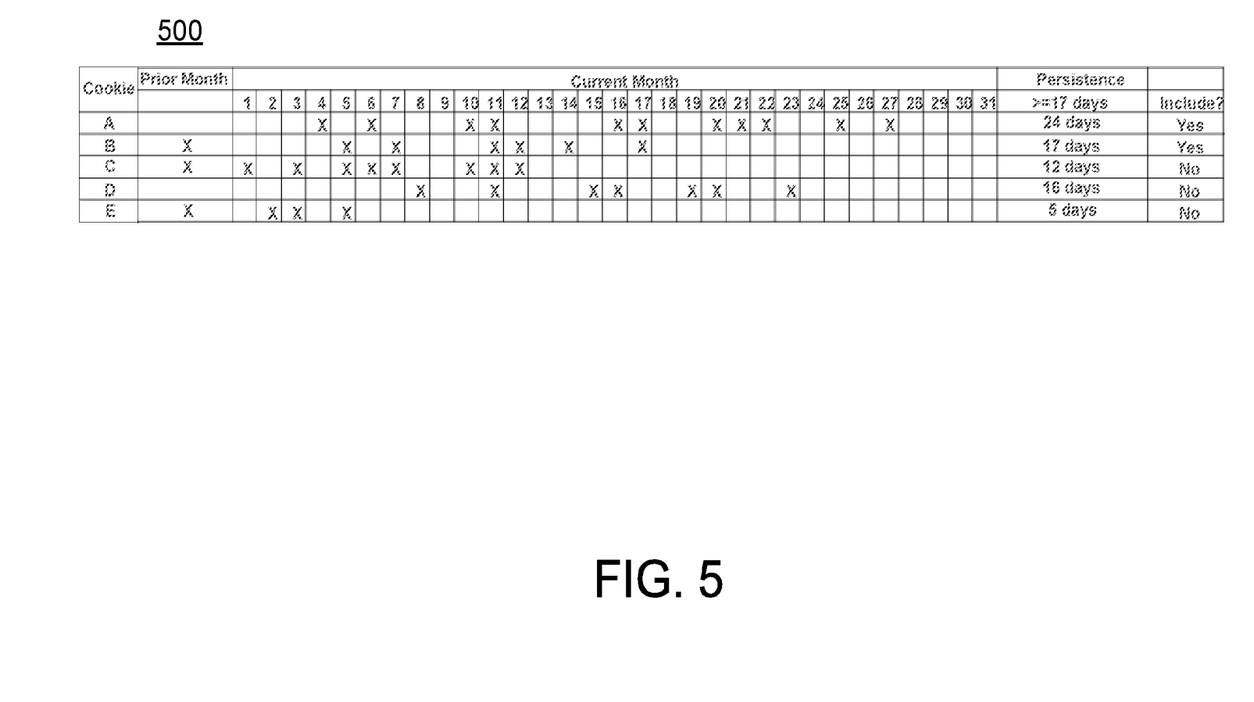
FIG. 5 is a table representing cookie data for the identification of persistent cookies.

The initial measurement module 204b may use the processed cookie data in order to identify persistent cookies suitable for use in generating an average number of hits per device (306). Persistent cookies are cookies that have persisted on a user device long enough to show activity over many days. FIG. 5 illustrates a number of records reflecting data for different cookies, which may be used to identify persistent cookies according to a defined set of rules.

In the cookie records illustrated by FIG. 5, each day in which a particular cookie is active is designated. Data about cookie activity during the previous month may also be designated, for example, by a simple "yes" or "no".

The initial measurement module 204b may identify persistent cookies as those which have persisted for more than a threshold number of days (subunits) during the present month (reporting period). The initial measurement module 204a may calculate the number of days the cookie has persisted (that is, the cookie's "persistence" during the recording period) as equal to the total number of days between the first and the last day with recorded activity for that cookie. For each cookie that has activity from the previous recording period, the initial measurement module may consider the first day of the current recording period to be that cookie's first day of activity for purposes of calculating the cookie's persistence.

In the example illustrated by FIG. 5, cookie A has first and last activity dates of the 4$^{th}$ and the 27$^{th}$, representing 24 days of persistence, and is therefore included as a persistent cookie. Cookie B has activity from the previous month through the 17$^{th}$, which the initial measurement module 204b counts as 17 days of persistence even though there is no activity on the 1$^{st}$ of the month. Cookie B is also included as a persistent cookie. Cookies C, D, and E have 12, 16, and 5 days of persistence, respectively, and so are not included as persistent cookies.

Other methods of identifying persistence may be used. For instance, in some implementations, the particular activity days for the previous reporting period may also be analyzed, with the total number of days persistent between the previous and current reporting period compared against a threshold. In some implementations using multiple reporting periods for persistent activity, a minimum persistence in the current reporting period may also be required to assure that the persistence reflects some persistence in the current reporting period. For example, at least 18 days of persistence between the previous and current months may be required, including activity on or after the 16$^{th}$ of the current month.

In some implementations, persistent cookies may also be identified by the fraction of active days in the month exceeding a threshold. For example, in one embodiment, activity on more than 60% of the days of the reporting period may identify a persistent cookie.

For each of the identified persistent cookies, the measurement adjustment module 204c calculates a weighted number of hits (308). The weighted hits are designed to estimate the total number of hits that the device represented by the cookie would have had if the cookie had persisted for the entire reporting period. In some implementation, the weighted hits may be defined by the following equation:

$$WH = \text{Hits} * (1 + TDNP/TDP)$$

In this equation, "WH" is the weighted number of hits for the reporting period for the device associated with the persistent cookie, "Hits" is the number of hits measured during the reporting period, "TDP" is the total number of days that the cookie was persistent during the reporting period, and "TDNP" is the total number of days that the cookie was not persistent during the reporting period—that is, the days in the reporting period not included in the days measured as persistent. For a reporting period of, for example, 31 days, TDP+TDNP=31.

Other formulas may be used to simulate the cookie's activity over a full month. In addition to the above data, some equations may use the variable "% AP," or active persistency, which represents the percent of days during the time that the cookie was measured as persistent that include some measured activity. Using the examples illustrated in FIG. 5, cookie A has a % AP of 11/24=0.458, and cookie B has a % AP of 6/17 of 0.353. Using the active persistency, the weighted hits can be calculated by the following equation:

$$WH = \text{Hits} + (\% AP * TDNP * (\text{Hits}/TAD))$$

In this equation, "TAD" is the total active days, which is the count of days that include some measured activity (for instance, 11 days for cookie A and 6 days for cookie B). Some embodiments may use other data in order to generate weighted hits based on persistent cookies.

The device classification module 204d then subdivides the data comprising the weighted hits associated with persistent cookies into device categories (310). Device categories may include a variety of different traits for each device, and a cookie may be included in the data for several different categories. For example, a cookie associated with a mobile device may be included in data for a mobile device make and model, a mobile device platform, a mobile device ISP, and more particular categories combining two of these features (such as "ISP and platform" or "ISP and make/model"). Data may also be sorted by geographic region, by user demographics, or by any other factor for which categorization is available by device.

For each device category for which the subdivision is made, the device classification module estimates an average hits per device, or HPD, value for that device category (312). In some implementations, the HPD for each device category may be the average of the weighted hits of all persistent cookies included in each device category:

$$HPD = \text{sum(all } WH \text{ in category)/total cookies in category.}$$

In some implementations, further data may be used to alter the HPD. For instance, in some implementations a weighted average may be used where the persistence or reliability of certain cookies may cause them to contribute more to the resulting HPD value than other cookies. Other adjustments, such as eliminating outliers or using other known statistical techniques in estimating a reliable average, may also be used.

Figure 4:
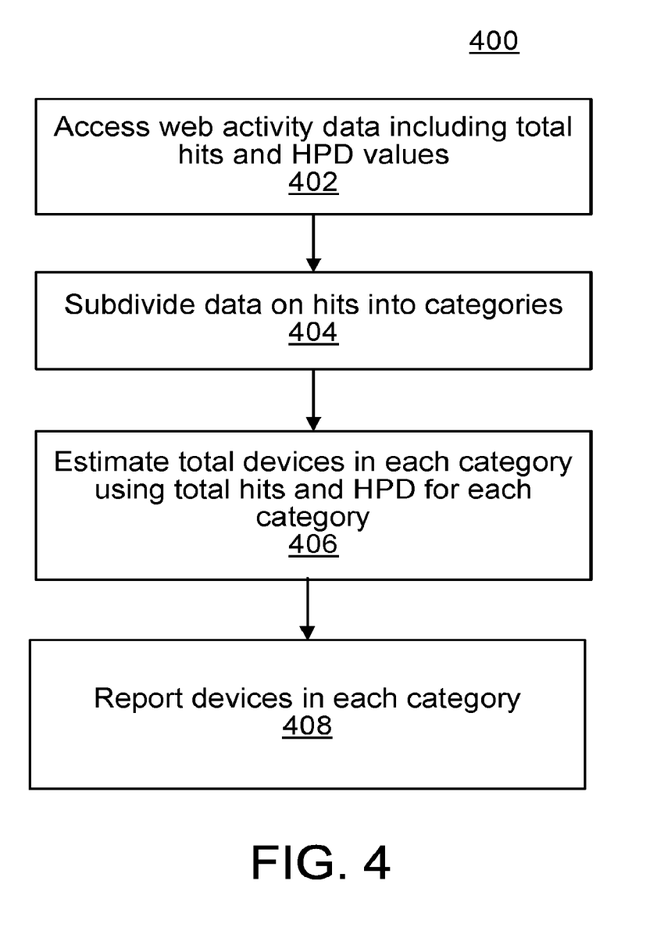
FIG. 4 is a flow chart illustrating an example of a process for using HPD values to estimate the total number of devices in each category of devices.

FIG. 4 is a flowchart illustrating an example of a process 400 by which HPD values may be used to estimate the total number of devices in certain categories. Although the process 400 may be used in conjunction with the system 200 and process 300 as described below, other systems and processes can be used in conjunction with the process 400.

The device classification module 204d accesses the web activity data 132, including the HPD values (402). As described above, the device classification module 204d may have generated the HPD values to begin with, in which case it may use the generated HPD values in conjunction with accessed data about the total number of hits.

The device classification module 204d subdivides the data representing the total number of hits measured over the relevant period into device categories (404). In some implementations, these device categories will match the device categories for which the HPD values have been generated.

For each device category for which the device classification module 204d has access to both a total number of hits for that category and an HPD value, the device classification module 204d estimates the total number of devices in that category 406. The estimate may use the following equation:

Total devices=Total hits/HPD

The report generation module 206 takes the total number of devices estimated for each category and uses this data to generate reports (408). The report generation module 206 may perform additional post-processing on the data, and may aggregate or further subdivide certain data based on report requirements and available information, to generate reports 208. The reports may include absolute numbers of devices in a particular category, relative market share of devices in one or more of the categories, device usage patterns, and any other data collected and processed.

The above-described implementations generate an estimate of unique devices using monitored web pages during a reporting period. The accuracy of this estimate may, in some cases, depend on a few assumptions. First, it may depend on the assumption that data usage on devices for which a persistent cookie can identified will be characteristic of data usage on all devices. It also assumes that a device will only have one cookie. Furthermore, it may depend on the assumption that, on average, a given device will have consistent activity levels over time not affected by whether or not cookies are deleted, such that it is reasonable to extend the data for a persistent cookie across the rest of the reporting period. Adjustments using additional data may be made to account for any inaccuracies in these assumptions. In some embodiments, the estimates may be adjusted by relevant panel, survey, or other data.

A number of implementations of the techniques have been described. Nevertheless, it will be understood that various modifications may be made. For example, useful results still could be achieved if steps of the disclosed techniques were performed in a different order and/or if components in the disclosed systems were combined in a different manner and/or replaced or supplemented by other components.

What is claimed is:

1. A method for evaluating web activity, the method comprising:

receiving activity data for one or more resources on a network for a predetermined time period, the resources having been accessed by a plurality of client systems, and the activity data including a unique identifier and a category of an accessing client system for each access to the one or more resources;

identifying at least one persistent identifier of a client system within the activity data;

identifying a subset of the activity data associated with the at least one persistent identifier of the client system that accesses the one or more resources;

determining, based on the subset of the activity data, a total number of accesses to the one or more resources from the client system having the persistent identifier; and determining, based on the determined total number of accesses to the one or more resources from the client system having the persistent identifier, an estimated number of accesses to the one or more resources from the client system having the persistent identifier if the persistent identifier persisted on the client system during the entire predetermined time period.

2. The method of claim 1, wherein determining the estimated number of accesses to the one or more resources from the client system having the persistent identifier comprises:

determining an active time period in which the unique identifier has been associated with the client system during the predetermined time period;

determining an inactive time period in which the unique identifier was not associated with the client system during the predetermined time period; and multiplying the determined total number of accesses to the one or more resources from the client system having the persistent identifier in the received activity data by one plus the ratio of the inactive time period to the active time period.

3. The method of claim 1, further comprising dividing the estimated number of accesses to the one or more resources from the client system based on the category of the accessing client system.

4. The method of claim 3, further comprising determining an average number of accesses of the one or more resources for each category of the accessing client system.

5. The method of claim 1, further comprising dividing the estimated number of accesses to the one or more resources from the client system based on a geographic location region of the accessing client system or demographics of a user of the accessing client system.

6. The method of claim 1, further comprising generating a report of unique client systems that have accessed the one or more resources over the predetermined time period based on the estimated number of accesses to the one or more resources from the client system having the persistent identifier.

7. The method of claim 1, wherein identifying the at least one persistent identifier of the client system comprises:

determining a length of time that the unique identifier has been associated with the client system;

comparing the length of time to a predetermined threshold; and determining that the length of time is greater than the predetermined threshold.

8. The method of claim 1, wherein identifying the at least one persistent identifier of the client system comprises:

determining a fraction of the predetermined time period in which the unique identifier has been associated with the client system;

comparing the fraction of the predetermined time period to a predetermined threshold; and determining that the fraction of the predetermined time period is greater than the predetermined threshold.

9. The method of claim 1, wherein the category of the accessing client system comprises one or more of a make of the client system, a model of the client system, a platform of the client system, and an Internet Service Provider of the client system.

10. The method of claim 1, further comprising preprocessing the received activity data for the one or more resources on the network to remove fraudulent, non-human initiated accesses to the one or more resources on the network.

11. The method of claim 1, wherein the activity data further comprises one or more of an identifier of the resource, a network address of the accessing client system, and a time that the client system accessed the resource for each access to the resource.

12. The method of claim 1, wherein the unique identifier for the accessing client system is stored in a cookie on the accessing client system.

13. A system for evaluating web activity, the system comprising:

one or more processing devices;

one or more storage devices storing instructions that, when executed by the one or more processing devices, cause the one or more processing devices to perform the following operations:

receive activity data for one or more resources on a network for a predetermined time period, the resources having been accessed by a plurality of client systems, and the activity data including a unique identifier and a category of an accessing client system for each access to the one or more resources;

identify at least one persistent identifier of a client system within the activity data;

identify a subset of the activity data associated with the at least one persistent identifier of the client system that accesses the one or more resources;

determine, based on the subset of the activity data, a total number of accesses to the one or more resources from the client system having the persistent identifier; and determine, based on the determined total number of accesses to the one or more resources from the client system having the persistent identifier, an estimated number of accesses to the one or more resources from the client system having the persistent identifier if the persistent identifier persisted on the client system during the entire predetermined time period.

14. The system of claim 13, wherein, to determine the estimated number of accesses to the one or more resources from the client system having the persistent identifier, the instructions include instructions that, when executed by the one or more processing devices, cause the one or more processing devices to:

determine an active time period in which the unique identifier has been associated with the client system during the predetermined time period;

determine an inactive time period in which the unique identifier was not associated with the client system during the predetermined time period; and multiply the determined total number of accesses to the one or more resources from the client system having the persistent identifier in the received activity data by one plus the ratio of the inactive time period to the active time period.

15. The system of claim 13, wherein the instructions include instructions that, when executed by the one or more processing devices, further cause the one or more processing devices to generate a report of unique client systems that have accessed the one or more resources over the predetermined time period based on the estimated number of accesses to the one or more resources from the client system having the persistent identifier.

16. The system of claim 13, wherein, to identify the at least one persistent identifier of the client system, the instructions include instructions that, when executed by the one or more processing devices, cause the one or more processing devices to:

determine a length of time that the unique identifier has been associated with the client system;

compare the length of time to a predetermined threshold; and determine that the length of time is greater than the predetermined threshold.

17. A non-transitory computer-readable medium storing instructions which, when executed, cause one or more processors to perform a method for evaluating web activity, the method comprising:

receiving activity data for one or more resources on a network for a predetermined time period, the resources having been accessed by a plurality of client systems, and the activity data including a unique identifier and a category of an accessing client system for each access to the one or more resources;

identifying at least one persistent identifier of a client system within the activity data;

identifying a subset of the activity data associated with the at least one persistent identifier of the client system that accesses the one or more resources;

determining, based on the subset of the activity data, a total number of accesses to the one or more resources from the client system having the persistent identifier; and determining, based on the determined total number of accesses to the one or more resources from the client system having the persistent identifier, an estimated number of accesses to the one or more resources from the client system having the persistent identifier if the persistent identifier persisted on the client system during the entire predetermined time period.

18. The non-transitory computer-readable medium of claim 17, wherein determining the estimated number of accesses to the one or more resources from the client system having the persistent identifier comprises:

determining an active time period in which the unique identifier has been associated with the client system during the predetermined time period;

determining an inactive time period in which the unique identifier was not associated with the client system during the predetermined time period; and multiplying the determined total number of accesses to the one or more resources from the client system having the persistent identifier in the received activity data by one plus the ratio of the inactive time period to the active time period.

19. The non-transitory computer-readable medium of claim 17, wherein the method further comprises generating a report of unique client systems that have accessed the one or more resources over the predetermined time period based on the estimated number of accesses to the one or more resources from the client system having the persistent identifier.

20. The non-transitory computer-readable medium of claim 17, wherein identifying the at least one persistent identifier of the client system comprises:
- determining a length of time that the unique identifier has been associated with the client system;
- comparing the length of time to a predetermined threshold; and
- determining that the length of time is greater than the predetermined threshold.

* * * * *